United States Patent [19]
MacNiel et al.

[11] 3,831,449
[45] Aug. 27, 1974

[54] DEPTH GAUGE

[76] Inventors: Douglas K. MacNiel, 1962 Balearic Dr., Costa Mesa, Calif. 92626; Sohiel Azizi, 17171 Bolso Chica, Huntington Beach, Calif. 92647

[22] Filed: Dec. 8, 1971

[21] Appl. No.: 205,933

[52] U.S. Cl. ................................. 73/300, 73/395
[51] Int. Cl. ....................................... G01f 23/14
[58] Field of Search ............................ 73/300, 395

[56] References Cited
UNITED STATES PATENTS

| | | | |
|---|---|---|---|
| 987,260 | 3/1911 | Schubert | 73/300 |
| 2,935,873 | 5/1960 | Stewart | 73/300 |
| 3,528,290 | 9/1970 | Lecocq | 73/300 |
| 3,712,138 | 1/1973 | Alinari | 73/300 |

FOREIGN PATENTS OR APPLICATIONS

| 470,298 | 12/1950 | Canada | 73/395 |
|---|---|---|---|

*Primary Examiner*—Richard C. Queisser
*Assistant Examiner*—Denis E. Corr

[57] ABSTRACT

An improved depth gauge for use by a diver having a bourdon tube assembly with appropriate linkages to operate a dial for indicating the ambient depths as a function of pressure. The bourdon tube is filled with oil and is exposed to pressure through an open end secured in a fitting having a passage with a diaphragm seated therein exposed to the ambient pressure. The exposure of the diaphragm operatively pressurizes the oil in the bourdon tube to cause it to expand and operate the linkages for turning the dial.

A second embodiment of this invention incorporates a capillary tube depth gauge in combination with a bourdon tube or other mechanically reacting depth gauge. The capillary tube surrounds the dial face of the gauge and has appropriately scribed markings to show the depth corresponding to the extent of entrance of water into the capillary tube which is a function of pressure. In this manner, the optimum accuracy of both types of gauges can be utilized.

5 Claims, 6 Drawing Figures

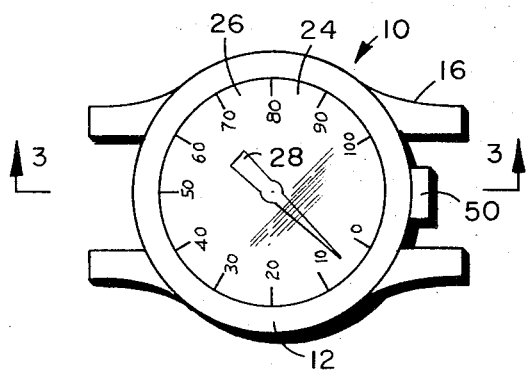
FIG. 2
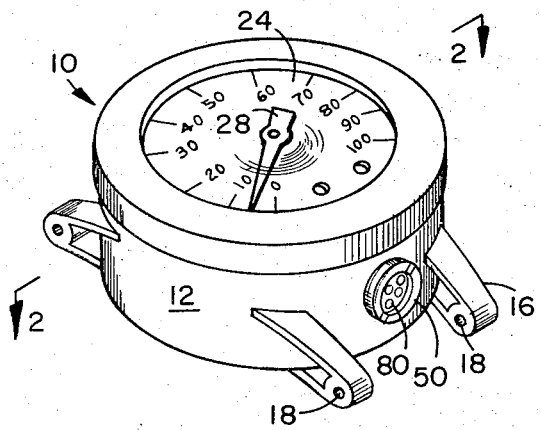
FIG. 1
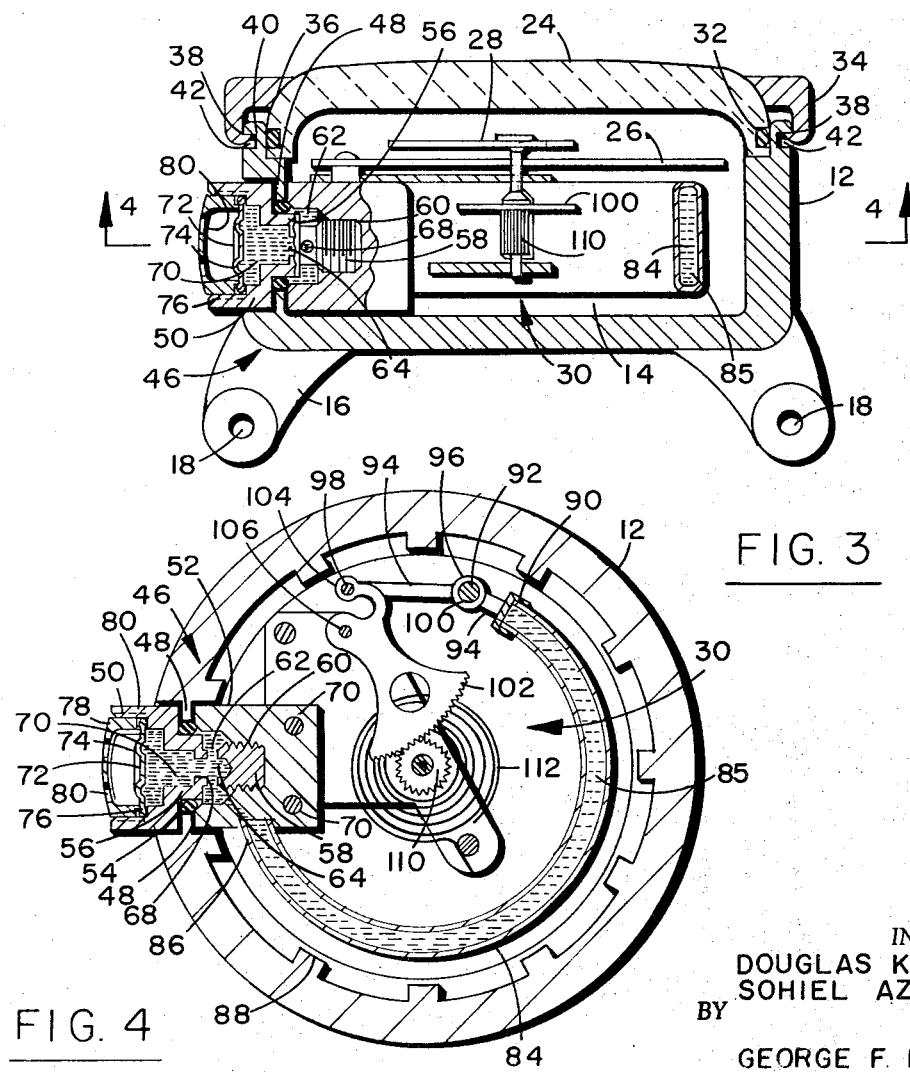
FIG. 3
FIG. 4
INVENTORS
DOUGLAS K. MAC NIEL
SOHIEL AZIZI
BY GEORGE F. BETHEL
ATTORNEY

DEPTH GAUGE

BACKGROUND OF THE INVENTION

1. Field of the Invention

The field of this invention lies within the depth gauge art.

2. The Prior Art

Depth gauges produced for underwater divers incorporate a number of mechanical movements relying on various principals. One of the more common depth gauges of the prior art incorporates what is known as a bourdon tube. The bourdon tube is a curved metallic tube and is connected to appropriate linkages for operating a dial. In many cases the bourdon tube is pressurized by ambient fluidic flow into the tube which causes it to expand.

Upon expansion, the straightening of the bourdon tube causes a linkage which is connected thereto to be driven. The linkage serves to drive a gear which in turn causes a pointer to move over a dial face for indicating a depth which is the pressure analog of the bourdon tube movement.

In some prior art applications, it is common to expose the open end of the bourdon tube to sea water. In other words, the bourdon tube is filled with sea water when a diver enters the water. As the diver increases his depth, the pressure of the ambient sea water builds up so that the bourdon tube moves in correspondence thereto.

Exposure of the bourdon tube to the sea water has been a substantial problem. Specifically, sea water contains substantial amounts of salt which tends to clog the openings and the bourdon tube after the gauge is removed from the water. The invention described hereinafter has made a significant contribution by avoiding clogging deposits which cause prior art depth gauges to fail. As can be appreciated, any failure upon the part of a depth gauge could be fatal to a diver.

Other drawbacks of the prior art include the fact that bourdon tube type depth gauges have not been sufficiently accurate to reflect correct pressures at shallow depths. This is because of the fact that a bourdon tube gauge cannot be designed to operate throughout the scale of the depths it is designed to be exposed to while at the same time register accurate readings at shallow depths. The inventors have found that other principals of the gauge art effectively create more accurate readings at shallow depths. Specifically, the inventors have found that a capillary type tube when closed at one end will allow the admission of water thereinto at shallow depths and register significantly greater accurate readings than the bourdon tube gauge at those depths. Thus, the inventors have established that a bourdon tube type gauge in combination with a capillary type gauge will enable a diver to obtain readings of greater accuracy throughout the depth of his dive.

SUMMARY OF THE INVENTION

In summation, this invention comprises a novel oil filled bourdon tube depth gauge, and an alternative embodiment combining a capillary tube and bourdon tube depth gauge.

More specifically, this invention comprises a bourdon tube depth gauge having its bourdon tube connected to a linkage for moving a needle or indicator over a dial face to indicate specific depths at which the gauge has been placed. The bourdon tube is filled with oil and is seated in a socket having a diaphragm at one end thereof exposed to the ambient sea pressure. Increases in sea pressure cause the oil in the bourdon tube to expand the tube and operate a linkage thereby turning the needle to indicate depth as a function of pressure. Thus, entrance of sea water into the tube for operating the bourdon tube depth gauge is avoided. As a consequence, deleterious residue and salt buildup is eliminated creating a superior and longer operating depth gauge.

As a novel combination, the inventors have invented a capillary tube gauge with a bourdon tube gauge to indicate accurate readings throughout the range of depths. The capillary depth gauge allows the entrance of water at its open end to penetrate to a certain level corresponding to the ambient pressure driving said water thereinto. The depth reading provided by the degrees of water entrance is a function of pressure. The capillary gauge is incorporated with a bourdon tube gauge which operates in an improved manner at depths below the depths which provide more accurate readings by the capillary tube depth gauge. Thus, a balance is struck between the most favorable operation of the gauges at their respective depths to provide a diver with a more accurate reading.

BRIEF DESCRIPTION OF THE DRAWINGS

FIG. 1 shows a perspective view of the gauge of this invention;

FIG. 2 shows a top plan view of the gauge of this invention;

FIG. 3 shows a sectioned view along line 3—3 of FIG. 2;

FIG. 4 shows a sectioned view of this invention along line 4—4 of FIG. 3;

DESCRIPTION OF THE PREFERRED EMBODIMENTS

Figure 5:
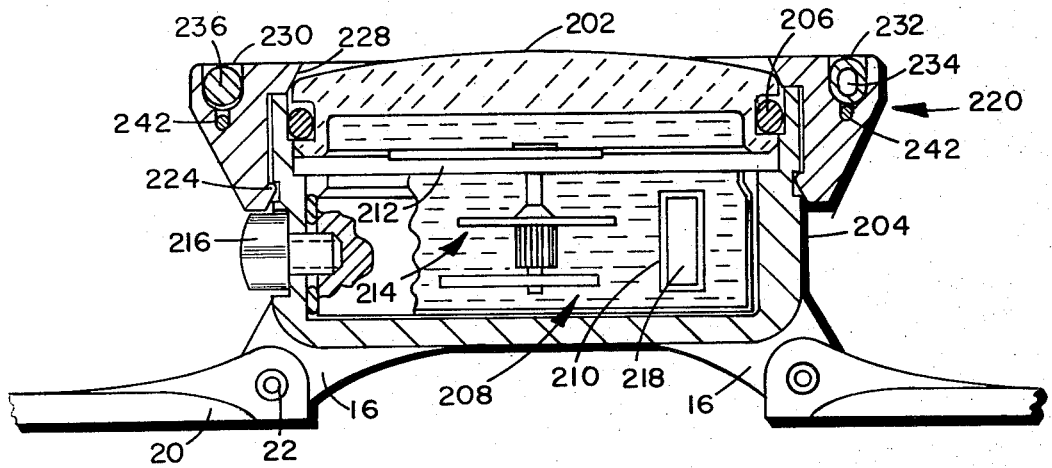
FIG. 5 shows a sectioned alternative embodiment of this invention incorporating a combination bourdon tube, gauge and capillary gauge; and, FIG. 6 shows an exploded view of a portion of the case, capillary depth gauge and lens shown in FIG. 5.

Looking at FIGS. 1 through 4 a bourdon tube type depth gauge 10 is shown having a major plastic case 12. The plastic case 12 is formed as a molded product providing a cavity 14 and four arms or appendages 16 having openings 18. The arms 16 support a wrist strap 20 which has been shown with an alternative embodiment in FIG. 5. The wrist strap 20 is secured to the arms 16 by means of pins 22 in the openings or eyes of the wrist strap in extended axial relationship with the holes 18 of the appendages or arms 16. Thus, the depth gauge of this invention is held to a user's wrist in a conventional manner as many wrist instruments.

The case 12 has a lens 24 overlying the cavity 14. The lens 24 can be made of any suitable material as long as it is transparent for purposes of viewing the dial face 26. The dial face 26 has numbers and scribe lines such as those shown in FIGS. 1 and 2 for indicating depth.

A pointer or needle 28 is pivotally connected to a bourdon tube meter movement generally shown at 30, which shall be described in greater detail. The pointer 28 moves across the face 24 of the gauge in a sweeping manner to indicate the depth at which the diver is.

The lens 24 is sealed in the case by an O-ring 32 held in place by a circumferentially surrounding retainer ring 34. The ring has an inner arcuately sectioned surface 36 for seating against a convex portion of the lens 24. The ring is also provided with a latching circumferential flange 38 which clamps onto the case by means of the ring 34 being snapped into position over a second circumferential flange 40 extending from the case 12 and overlying a circumferential groove 42 therein. The assembly of the lens 24 to the case by the ring 34 also seals the lens with a tightened interface to the case 12.

The case 12 has an opening 46 which incorporates a circumferential flange 48 of reduced cross section from the total cross sectional thickness of the case 12. The flange 48 cooperates with a socket fitting 50, a socket fitting receipt block 52, and an O-ring 54 to provide a seal for the interior cavity of the case 12 and to prevent the escape of fluid from the bourdon tube 84. This enables pressure differentials to be effectuated between the interior of the case 12 and the ambient pressure surrounding the case, as well as the inside of the bourdon tube.

The socket fitting 50 is provided with an intermediate narrowed portion 56 which has a threaded extension 58 with threads 60. The threaded extension 58 and the narrowed intermediate section 56 are joined by a neck 62 having an axial bore 64 passing therethrough. A radial bore 68 is provided in the neck 62 across its width so that the axial bore 64 can communicate radially and outwardly of the neck in a manner that will be explained.

The socket receipt block 52 is provided with internal threads and a bore for receipt of the threaded extension 58 in axial relationship therewith. The threaded extension 58 is secured in the case by the foregoing means, but can be held in internal relationship of the case 12 in locked juxtaposition thereto by any other suitable means.

The socket fitting 50 has an enlarged bore portion 70 with an elastomeric diaphragm or other flexible diaphragm on portion 72 placed thereover. The diaphragm 72 has an annular inner raised section 74 and an outer annular seal 76.

The diaphragm 72 is seated in tight juxtaposition within the socket fitting by means of a threaded retainer ring 78. The threaded retainer ring 78 has threads 80 for seating within matching internal threads of the socket 50. The threaded retainer ring 78 also incorporates openings 80 for the passage of sea water thereinto to provide exposure of the ambient pressure against the face of the diaphragm 72.

The socket receipt fitting 52 has a bourdon tube 84 connected thereinto by means of a joint 86 so that it communicates with the bore of the socket receipt fitting through a passage 88. The bourdon tube 84 is closed at the end distal from the passage 88 by means of a cover 90, which is connected to a pin 92 by means of an extension 94.

The bourdon tube cavity 85 and the passages 62, 64, 70 and 88 are filled with a silicone oil or any other substantially incompressible fluid. As can be appreciated, the oil transmits the pressure on the face of the diaphragm 72.

The pin 92 is connected to a linkage arm 94 by means of a collar 96 at one end thereof. A second pin 98 of the linkage arm 94 is connected to a gear segment and lever 100 having teeth 102 and a collar 104 pivotally oriented on a pin 106. The gear segment 102 causes a pinion gear 110 to turn the pointer 28 connected thereto. The entire element is spring biased by a spring 112 so that the pointer 28 will reindex itself to zero when the oil in the bourdon tube does not have the pressure imposed thereon through the face of the diaphragm 72.

As can be appreciated, when pressure is applied to the face of the diaphragm 72 by sea water entering the holes 80 of the retainer 78, it is transmitted to the bourdon tube. Inasmuch as the bourdon tube assembly environment is only one atmosphere in the cavity case 14, any pressure thereon will cause it to straighten or move out of its arcuate position, thereby driving pin 92 and causing the entire linkage to move the pointer 28 for indicating an analog of the pressure encountered on the face of the diaphragm 72 as a measurement of depth. It should be well noted that the novel feature of this particular invention incorporates the use of the non-clogging silicone oil for purposes of transmitting the pressure. In this manner no rusting or deleterious clogging is encountered within the system as in the prior art.

Figure 6:
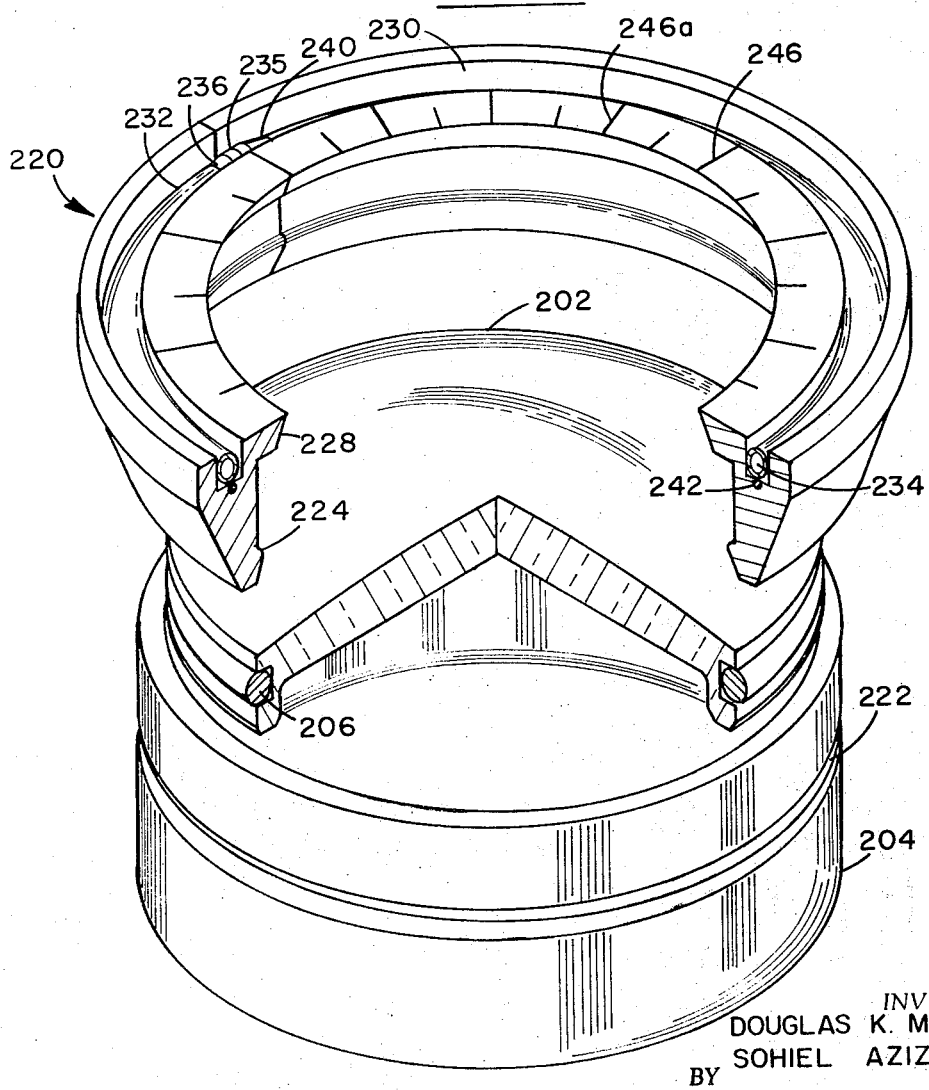

Looking more specifically at FIGS. 5 and 6, a lens 202 is shown in tight juxtaposition to a case 204 having an O-ring 206 sealing it thereto. The case 204 is similar to the case 12 of the showings in FIGS. 1 through 4. However, as will be explained, it has a different configuration in some respects for purposes of retaining a capillary tube depth gauge assembly which it forms a combination with.

The case 204 has a bourdon tube depth gauge movement generally shown within the case as assembly 208. The bourdon tube depth gauge has a bourdon tube 210, a dial plate 212, a gear movement shown generally at 214 and a fitting 216. The fitting tightly secures the movement into the case and does not serve the purpose of introducing pressure into the tube.

The gauge case 204 is filled with oil or other suitable non-compressible liquid. The bourdon tube 210 can be evacuated to create less force against which the ambient pressures must act for causing the meter movement to respond. The bourdon tube movement must be calibrated to zero when the outside of the gauge is exposed to atmospheric pressure.

When pressure is exerted on the surface of lens 202 by causing the gauge to be placed at a certain depth, it causes the oil in the case to pressurize the bourdon tube. This in turn causes the bourdon tube to contract and move the meter movement providing an analog reading of depth. It is not necessary that the gauge incorporate any specific bourdon tube movement. This alternative embodiment can be used with most state of the art mechanically linked gauges such as those which permit the passage of water into the bourdon tube and the oil filled gauges described above.

As previously stated, the bourdon tube depth gauge generally does not reflect its most accurate readings at shallow depths. As a consequence, the inventors have found that the combination of the bourdon tube depth gauge and the capillary depth gauge combination which shall be described provides more accurate readings in one instrument as to shallow and deep depths.

Specifically, the combination of the capillary depth gauge and the bourdon tube depth gauge comprises the case 204 with the internal elements as previously described. Additionally, a ring-shaped member or assembly clamps over the case 204 of the depth gauge. The case 204 of the depth gauge has a circular annulus 222 which receives a circular flange 224 of the ring assembly 220. As can be seen, the case 204 receives the lens 202 along with an O-ring 206, which is seated therein. The ring assembly 220 has an interior flange 224 which seats within the groove 222 in a locking manner while at the same time providing pressure on the lens 202 by means of an interior tapered surface 228.

The ring assembly 220 incorporates a channel 230 having a capillary tube 232 therein. The capillary tube 232 has an opening 234 which allows the entrance of water under pressure thereinto. The capillary tube 232 is plugged by a plug 236 which has been shown in cross section. The open end of the tube 235 leading to the passage has a fitting 240 for holding the capillary tube in juxtaposition to the closed end 236, and is seated tightly within the groove 230.

Beneath the capillary tube 232 is a wire 242 which enhances the reading of the capillary depth gauge as will be described. The capillary depth gauge ring assembly 220 has a series of readings 246 around its periphery which register the depth at which the capillary depth gauge has been placed. Specifically, the capillary depth gauge causes a reading to be registered when water enters the passage 234 through the fitting 240. As water rises to a scribe mark such as 246a, a reading will be indicated. The reading is enhanced by virtue of the fact that the water within the capillary tube 234 enlarges the wire 242 up to the miniscus or terminal point of the water.

Specifically, the water over the wire 242 creates a situation wherein the miniscus and the amount of water in the capillary tube enlarges the wire 242 by refraction to the point where the water in the tube is markedly differentiated. In this manner, an accurate reading can be made of shallow depths at which the depth gauge has been placed.

In operation, a diver reads the capillary tube depth gauge at the depth at which it operates most favorably. If the diver proceeds beyond the optimum depth at which the capillary depth gauge 220 operates, the diver then takes his reading from the bourdon tube depth gauge which turns the pointer on the inner portion of the depth gauge. In this manner, a diver can obtain a substantially more accurate reading than using one depth gauge or the other.

It should be noted that the ring 220 or similar assembly using a capillary depth gauge can be used with any depth gauge or be used singularly. Thus, the diver can utilize the depth gauge ring assembly 220 to clamp on state of the art bourdon tube depth gauges by any suitable means, so long as it does not block the view through the lens 202 of the depth gauge.

It should be understood that the showing of the specific embodiments hereinbefore was for exemplary purposes only and is the most clear and precise showing which the inventors know of as required by 35 USC, Section 112. However, other specific embodiments utilizing the concept and form as taught in the foregoing embodiments can be derived from the teachings thereof. As a consequence, the scope and breadth of this invention is only to be read in light of the following claims.

We claim:

1. A depth gauge for aquatic use comprising:
   a bourdon tube gauge movement;
   a casing surrounding said bourdon tube gauge movement in which said movement is held and having an opening in the wall of the casing;
   a liquid within said bourdon tube comprised of at least a partial composition of oil;
   dial means for indicating depth as an analog of the extent to which the liquid in said bourdon tube has been pressurized by ambient pressure;
   a fitting in connected relationship to an open end of said bourdon tube for passage of said liquid from said fitting into said bourdon tube;
   a flexible member inserted in said fitting interposed between said liquid in said bourdon tube and the surrounding ambient pressure;
   a seating member for receiving said fitting and interposed for fluid connected relationship between said fitting and said bourdon tube and adapted to be interfaced with said fitting through the opening in the wall of said casing;
   wherein said flexible member is implaced within said fitting so that liquid from said fitting can serve to transmit ambient pressure to the fluid in said bourdon tube; and,
   an elastomeric seal adapted for sealing the interior of said casing from ambient pressure at the opening in the wall of said casing.

2. The depth gauge as claimed in claim 1 wherein said flexible member comprises:
   an elastomeric material.

3. A depth gauge as claimed in claim 2 further comprising:
   a circumferential retainer secured into said fitting for holding said flexible member in place.

4. The depth gauge as claimed in claim 1 further comprising:
   a capillary depth gauge combined therewith in at least partial circumferential relationship to said dial means.

5. The depth gauge as claimed in claim 4 wherein said capillary type depth gauge comprises:
   a transparent tube having an open end, and a closed end;
   a ring having a groove with said capillary tube seated within said groove;
   an elongated object beneath the capillary tube; and,
   scribed markings around the circumferential exposed surface of said ring to indicate the depth at which said capillary tube is placed as a function of pressure driving water into the opening of said capillary depth gauge.

* * * * *